United States Patent
Clanton

(10) Patent No.: US 10,052,914 B2
(45) Date of Patent: Aug. 21, 2018

(54) SYSTEM AND METHOD FOR CHANGING TIRES

(71) Applicant: Dion Shondal Clanton, Houston, TX (US)

(72) Inventor: Dion Shondal Clanton, Houston, TX (US)

( * ) Notice: Subject to any disclaimer, the term of this patent is extended or adjusted under 35 U.S.C. 154(b) by 631 days.

(21) Appl. No.: 14/540,024

(22) Filed: Nov. 12, 2014

(65) Prior Publication Data

US 2015/0132089 A1    May 14, 2015

Related U.S. Application Data

(60) Provisional application No. 61/962,567, filed on Nov. 12, 2013.

(51) Int. Cl.
*B60B 30/10* (2006.01)
*B60B 29/00* (2006.01)

(52) U.S. Cl.
CPC ............ *B60B 30/10* (2013.01); *B60B 29/001* (2013.01); *B60B 29/002* (2013.01)

(58) Field of Classification Search
CPC .............................. B60B 29/002; B60B 30/10
USPC .................................................. 414/426, 427
See application file for complete search history.

(56) References Cited

U.S. PATENT DOCUMENTS

| | | | | |
|---|---|---|---|---|
| 4,771,531 | A * | 9/1988 | Asher ................... | B60B 29/002 254/2 R |
| 6,382,644 | B1 * | 5/2002 | Rawlings .............. | B60B 29/002 280/47.35 |
| 7,677,582 | B2 * | 3/2010 | Hedley ................. | B60B 29/002 280/79.11 |

* cited by examiner

*Primary Examiner* — Jonathan Snelting
(74) *Attorney, Agent, or Firm* — Spradley PLLC; Michael Spradley

(57) ABSTRACT

This disclosure relates to a system and method for changing tires. A tire-changing device can comprise a frame and a tire holder. The frame can comprise a U-shaped frame and an L-shaped frame. The U-shaped frame can comprise a base and a pair of shafts. Each of the shafts can be connected at both ends of the base. The L-shaped frame can comprise a short beam and a long beam. One end of the short beam can be attached at the bottom of the long beam. The other end of the short beam can be connected at the middle portion of the base. The tire holder can be attachable with the L-shaped frame. The tire holder can comprise a base plate, a plurality of prongs, and an L-shaped connector. The base plate can comprise a disc and a plurality of blades. The disc can be placed at the center of the blades. Each of the prongs can be attached at the top edge portion of each of the blades. The L-shaped connector can comprise a vertical member and a horizontal member.

23 Claims, 17 Drawing Sheets

SYSTEM AND METHOD FOR CHANGING TIRES

PRIORITY

This application is a non-provisional application of provisional application 61/962,567 filed Nov. 12, 2013.

BACKGROUND

This disclosure relates to a system and method for changing tires.

There can be situations wherein a driver will find himself stuck on a road because of a flat tire. Knowing how to change a tire is important to every driver. However, changing a flat tire can be a very frustrating and inconvenient experience. It can involve unmounting the spare tires, maneuvering the tires, and mounting the tires into the vehicle's axle.

Furthermore, spare tires on SUVs and trucks are often mounted underneath the vehicle. A crank system can be used to unmount and lower down spare tires from the bottom of the vehicle. Once the spare tire is on the ground, the tire needs to be dragged away from under the vehicle in order to retrieve it. This method can work however dragging a spare tire can cause damage to the tire. Moreover, such method can be inconvenient to the user since spare tires can be heavy. Further, removing a damaged tire from the axle and replacing it with a new tire can be a cumbersome process, especially for a smaller person.

As such it would be useful to have an improved system and method for changing tires.

SUMMARY

This disclosure relates to a system and method for changing tires. A tire-changing device can comprise a frame and a tire holder. The frame can comprise a U-shaped frame and an L-shaped frame. The U-shaped frame can comprise a base and a pair of shafts. Each of the shafts can be connected at both ends of the base. The L-shaped frame can comprise a short beam and a long beam. One end of the short beam can be attached at the bottom of the long beam. The other end of the short beam can be connected at the middle portion of the base. The tire holder can be attachable with the L-shaped frame. The tire holder can comprise a base plate, a plurality of prongs, and an L-shaped connector. The base plate can comprise a disc and a plurality of blades. The disc can be placed at the center of the blades. Each of the prongs can be attached at the top edge portion of each of the blades. The L-shaped connector can comprise a vertical member and a horizontal member.

This disclosure also teaches a method for changing tires. The method can comprise placing a tire-changing device beneath a spare tire that is in a vehicle. The tire-changing device can comprise a frame and a tire holder. The frame can comprise a U-shaped frame and an L-shaped frame. The U-shaped frame can comprise a base and a pair of shafts. Each of the shafts can be connected at both ends of the base. The L-shaped frame can comprise a short beam and a long beam. One end of the short beam can be attached at the bottom of the long beam. The other end of the short beam can be connected at the middle portion of the base. The tire holder can be attachable with the L-shaped frame. The tire holder can comprise a base plate, a plurality of prongs, and an L-shaped connector. The base plate can comprise a disc and a plurality of blades. The disc can be placed at the center of the blades. Each of the prongs can be attached at the top edge portion of each of the blades. The L-shaped connector can comprise a vertical member and a horizontal member. The method can also comprise mounting the spare tire into the tire-changing device, and maneuvering the tire-changing device in desired position.

DETAILED DESCRIPTION

Described herein is a system and method for changing a tire. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
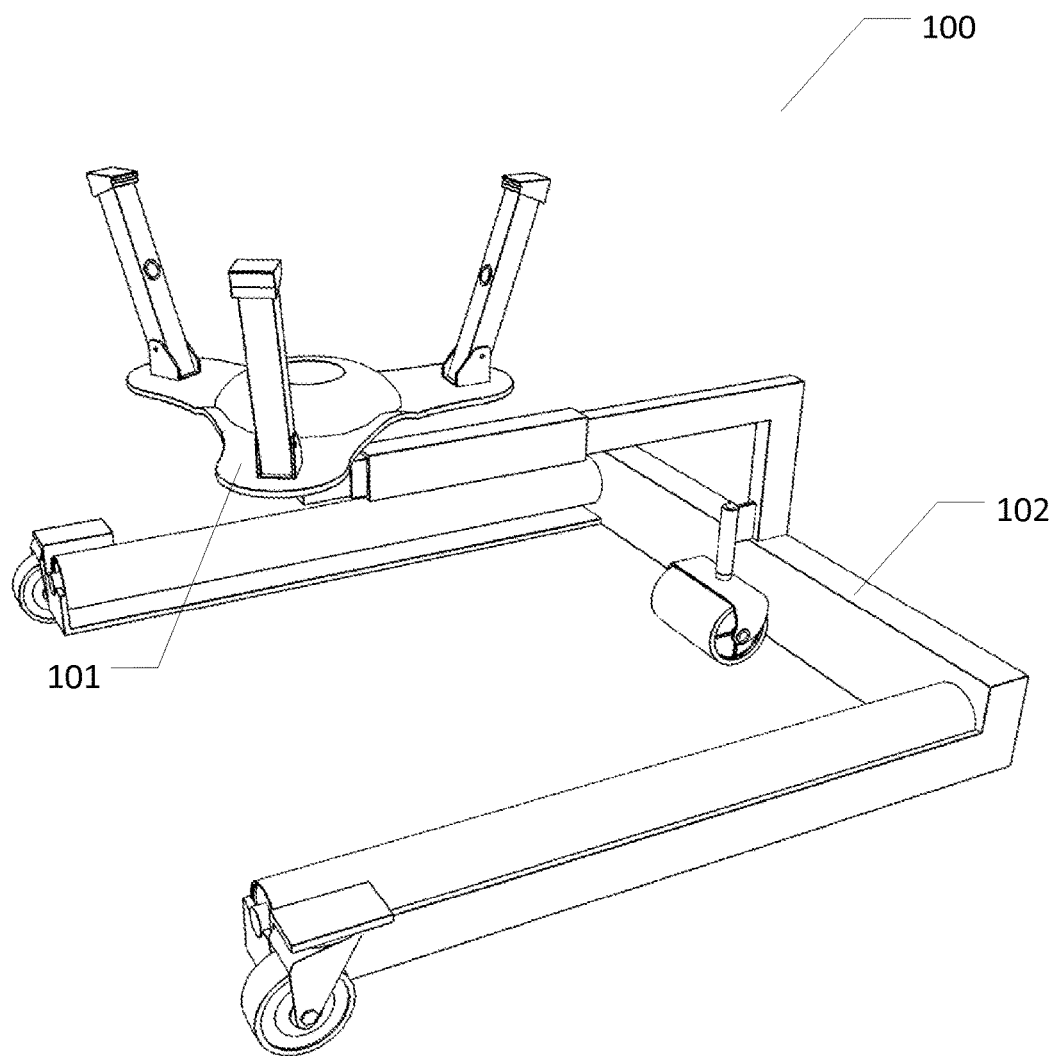
FIG. 1 illustrates a tire-changing device comprising a tire holder, and a frame.

FIG. 1 illustrates a tire-changing device 100 comprising a tire holder 101, and a frame 102. Tire-changing device 100 can be used to retrieve spare tires that are mounted at the bottom of a vehicle, in one embodiment. In another embodiment, tire-changing device 100 can be used to slide a spare tire to and from an axle easily. Tire holder 101 and frame 102 can be made of durable materials that can include but is not limited to metal, plastic, wood, and/or rubber. In one embodiment, tire holder 101 can be attachable and detachable from frame 102. In another embodiment, tire holder 101 and frame 102 can be permanently attached together.

Figure 2A:
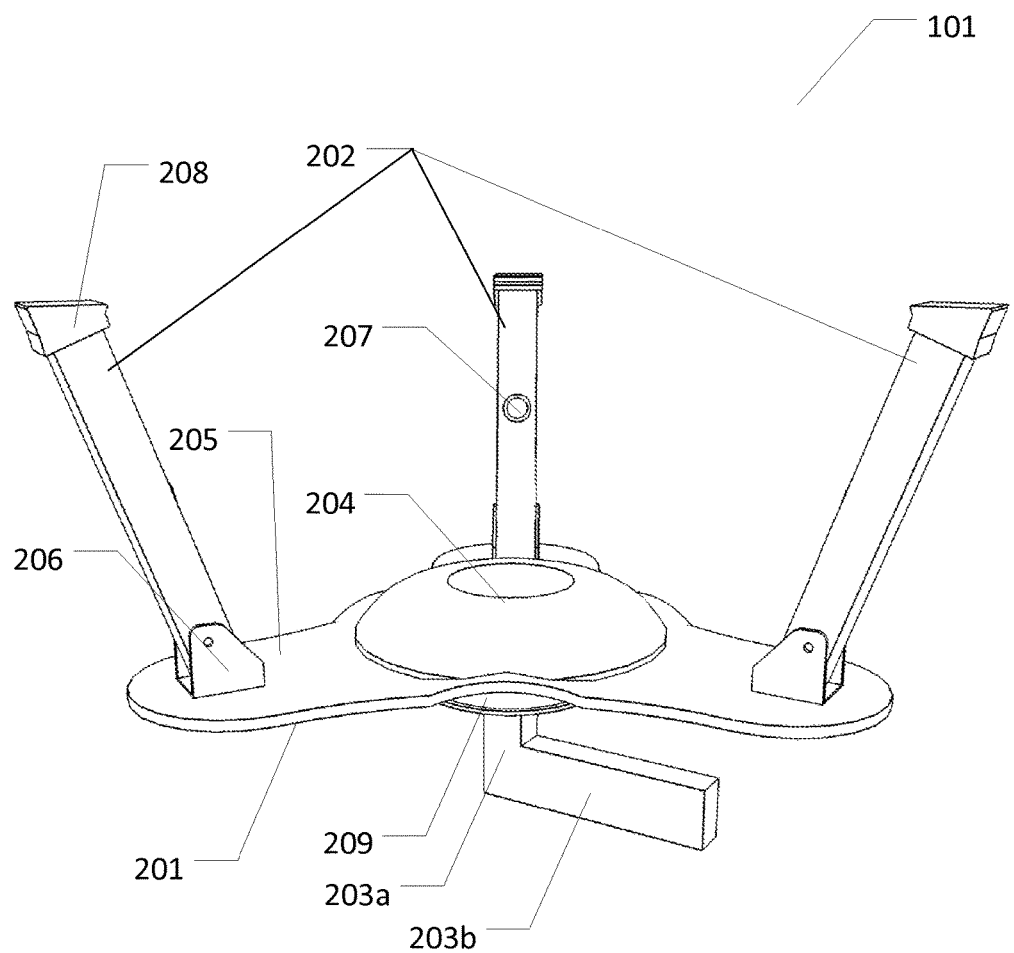
FIG. 2A illustrates tire holder comprising a base plate, a plurality of prongs, and an L-shaped connector.

FIG. 2A illustrates tire holder 101 comprising a base plate 201, a plurality of prongs 202, and an L-shaped connector 203. In preferred embodiments, tire holder 101 can comprise between three and five prongs. Base plate 201 can comprise a disc 204 and a plurality of blades 205. Disc 204 can be placed at the center of blades 205. Each prong 202 can be attached at the top edge portion of each blade 205 through a caster 206 or any other attachment means known in the art. In one embodiment, each prong 202 can comprise a LED light 207. LED light 207 can be used as a source of light when tire-changing device 100 is used under a vehicle. Caster 206 can allow prongs 202 be folded towards disc 204. Furthermore, caster 206 can secure prongs 202 at a slanting position and prevent prongs 202 from completely folding backwards. The tip of each prong 202 can comprise a rubber stopper 208. Rubber stopper 208 can prevent a spare tire from slipping off of tire-changing device 100. L-shaped connector 203 can comprise a vertical member 203a and a horizontal member 203b. The tip of vertical member 203a can comprise a swivel bearing 209. Swivel bearing 209 can be mounted at the bottom of base plate 201 and can be positioned directly below disc 204.

Figure 2B:
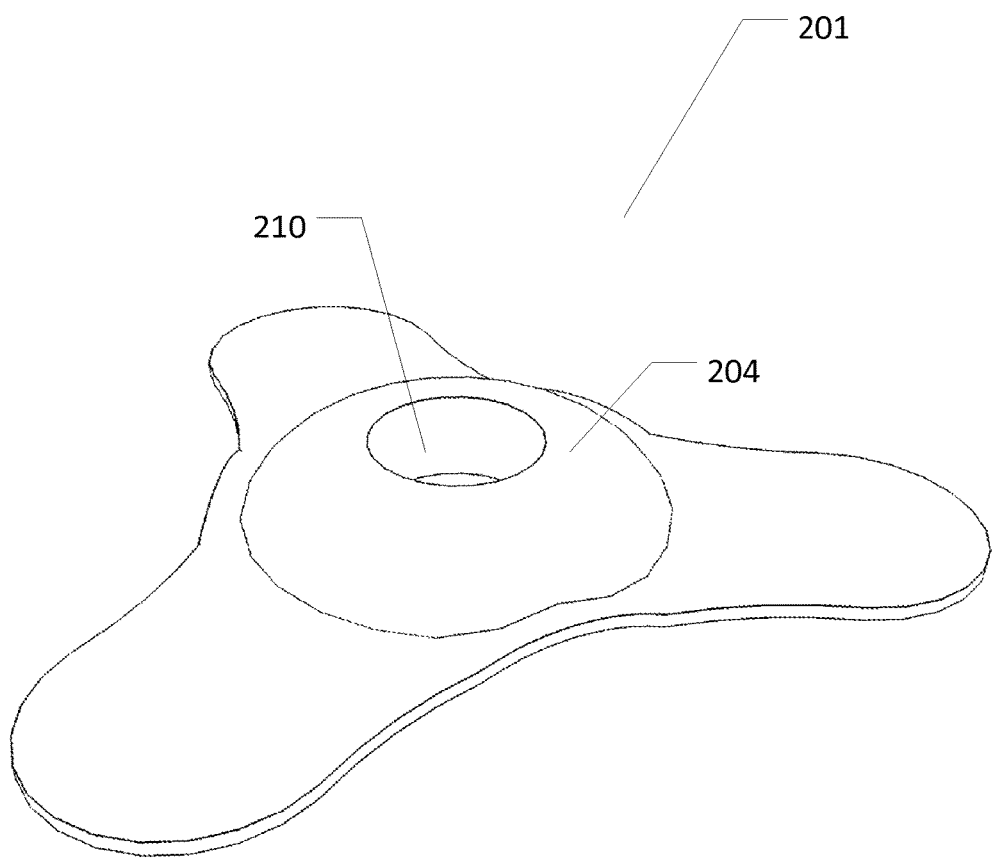
FIG. 2B illustrates a top view of base plate.

FIG. 2B illustrates a top view of base plate 201. In this embodiment, disc 204 can further comprise an orifice 210. Swivel bearing 200 can be connected to base plate 201 through orifice 210. As such, orifice 210 can be mateable with swivel bearing 209. This structure can allow base plate 201 be rotatable at the top of L-shaped connector 203.

Figure 2C:
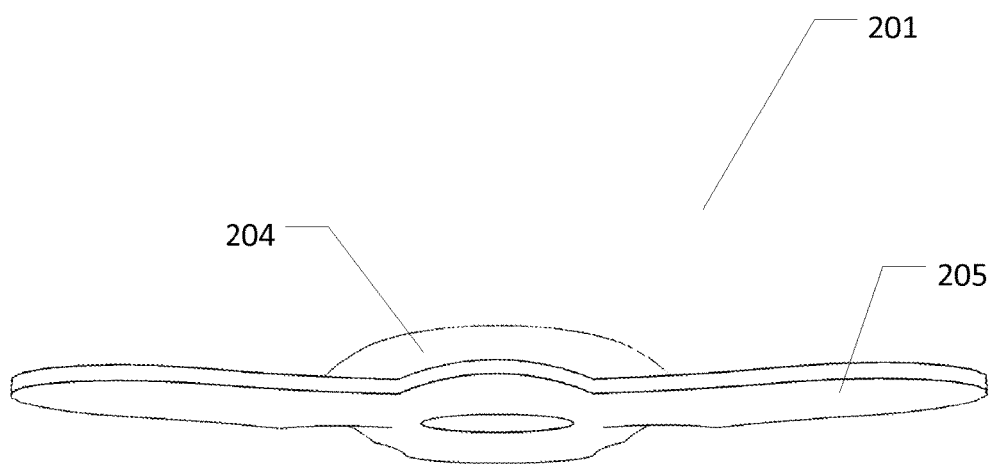
FIG. 2C illustrates a bottom view of base plate.

FIG. 2C illustrates a bottom view of base plate 201. Disc 204 can protrude from base plate 201, while the outer portion of each blade 205 can form a flat surface. In this structure, the inner surface of disc 204 can be hollow.

Figure 3:
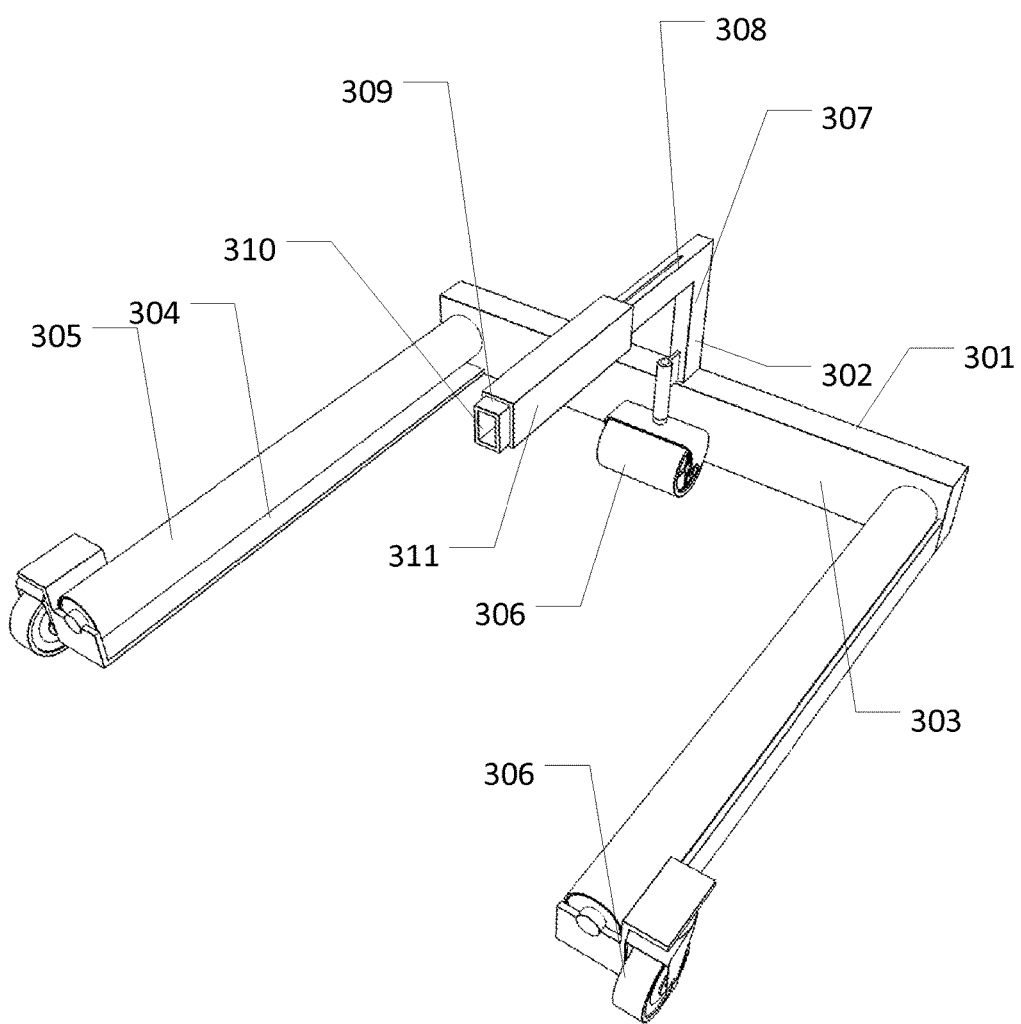
FIG. 3 illustrates a frame comprising a U-shaped frame, and an L-shaped frame.

FIG. 3 illustrates frame 102 comprising a U-shaped frame 301 and an L-shaped frame 302. U-shaped frame 301 can comprise a base 303 and a pair of shafts 304. Each shaft 304 can be connected at both end portion of base 303 forming a U-shape. The top surface of each shaft 304 can comprise a roller 305 while the front-end portions of each shaft 304 can comprise a wheel caster 306. Roller 305 can be a cylinder that rotates within the axis of shaft 304. This can allow the tire to be easily maneuvered at the top surface of U-shaped frame 301. Wheel caster 306 can allow tire-changing device be moved easily.

L-shaped frame 302 can comprise a short beam 307 and a long beam 308. One end of short beam 307 can be attached at the bottom of long beam 308 forming an L-shape. The other end of short beam 307 can be connected at the middle portion of base 303. Additionally, the other end of short beam 305 can also comprise wheel caster 306. In this structure, long beam 308 can be in parallel with shafts 304. Furthermore long beam 308 can further comprise a sliding sleeve 309. Sliding sleeve 309 can be mounted at the outer end of long beam 308. Sliding sleeve 309 can comprise cavity 310 that can allow sliding sleeve 309 be extendable and retractable within long beam 308. In one embodiment sliding sleeve 309 can comprise a rubber grip 311. In such embodiment, sliding sleeve 309 can provide better grip and comfort for the user when tire-changing device 100 is being maneuvered under a vehicle.

In one embodiment, U-shaped frame 301 and L-shaped frame 302 can be a single device. In such embodiment, L-shaped frame 302 can be permanently attached to U-shaped frame 301. In another embodiment, L-shaped frame 302 can be detachable from U-shaped frame 301. In this embodiment, L-shaped frame 302 can be connected to U-shaped frame 301 through a fastening mechanism.

Figure 4A:
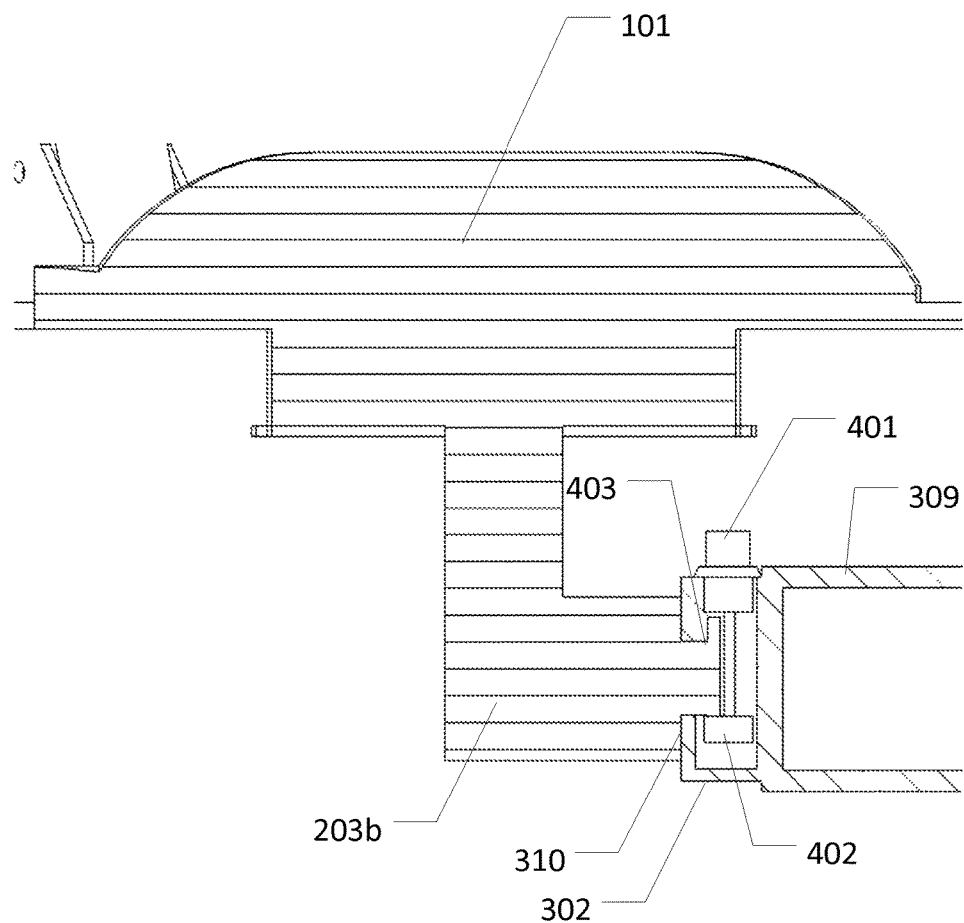
FIG. 4A illustrates a tire holder attached with an L-shaped frame.

FIG. 4A illustrates tire holder 101 attached with L-shaped frame 302. Horizontal member 203b of tire holder 101 can be insertable within cavity 310 of sliding sleeve 309. In this embodiment, sliding sleeve 309 can comprise a button 401. Button 401 can be a spring button lock that can secure tire holder 101 within sliding sleeve 309, in one embodiment. In such embodiment, button 401 can comprise a catch 402 while the outer end of horizontal member 203b can comprise a guide 403. Guide 403 can be compatible with catch 402. When horizontal member 203b is inserted within cavity 310, catch 402 can extend away from button 401. Once guide 403 is within sliding sleeve 309, catch 402 can retract that can secure guide 403 within catch 402.

Figure 4B:
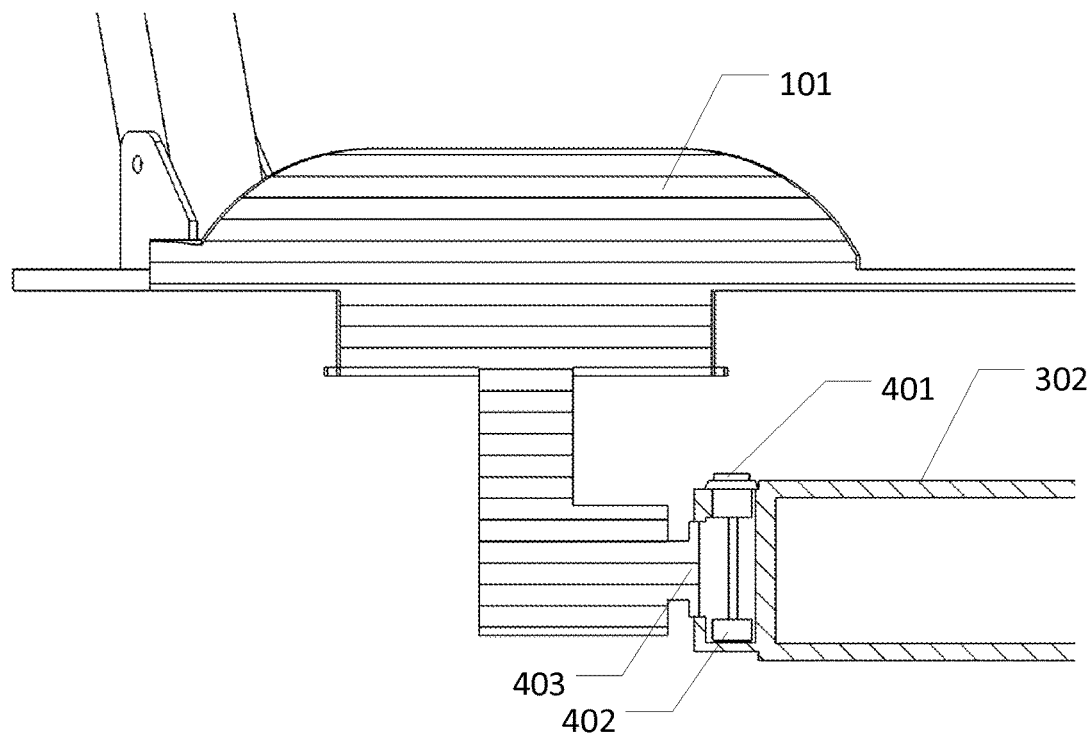
FIG. 4B illustrates a tire holder detached from an L-shaped frame.

FIG. 4B illustrates tire holder 101 detached from L-shaped frame 302. Pressing button 401 can allow catch 402 to expand, which can unfasten guide 403 that is secured within catch 402. This can detach tire holder 101 from L-shaped frame 302.

Figure 5A:
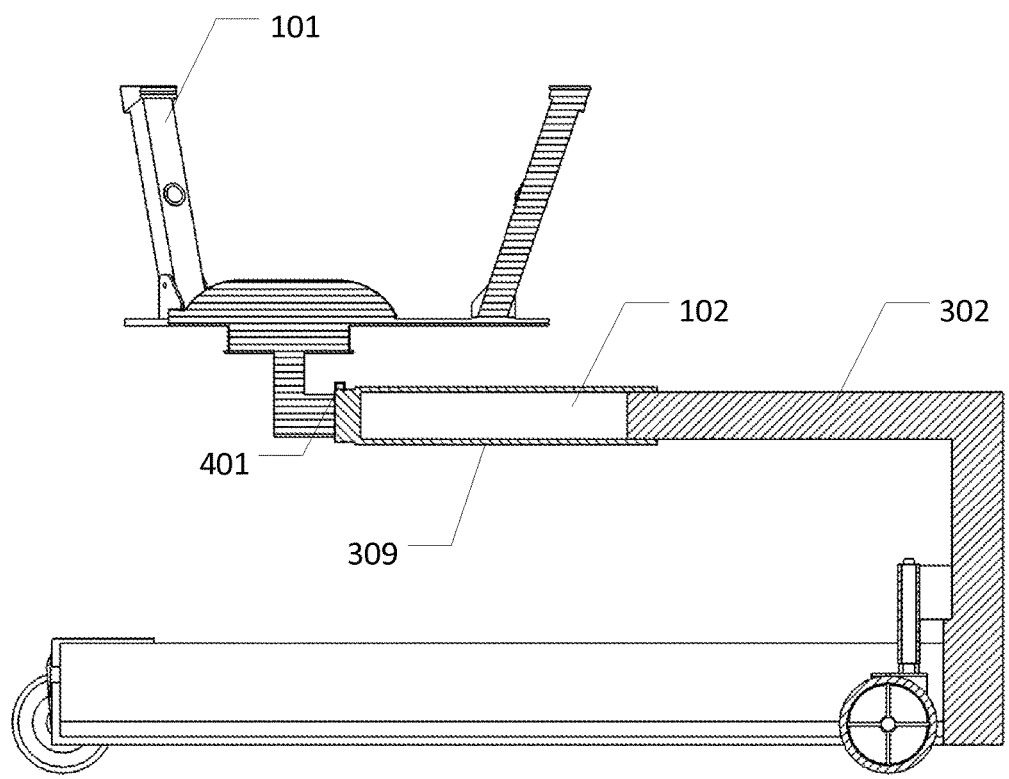
FIG. 5A illustrates a sectional view of a sliding sleeve that is fully extended from an L-shaped frame 302.

FIG. 5A illustrates a sectional view of sliding sleeve 309 that is fully extended from L-shaped frame 302. In this embodiment, sliding sleeve 309 can be adjustable from frame 102. In such embodiment, moving sliding sleeve 309 outwards can allow tire holder 101 to extend outwards. This can allow tire holder 101 to extend longer. Such feature can be used to balance and manage the weight of spare tires that is mounted onto tire holder 101.

Figure 5B:
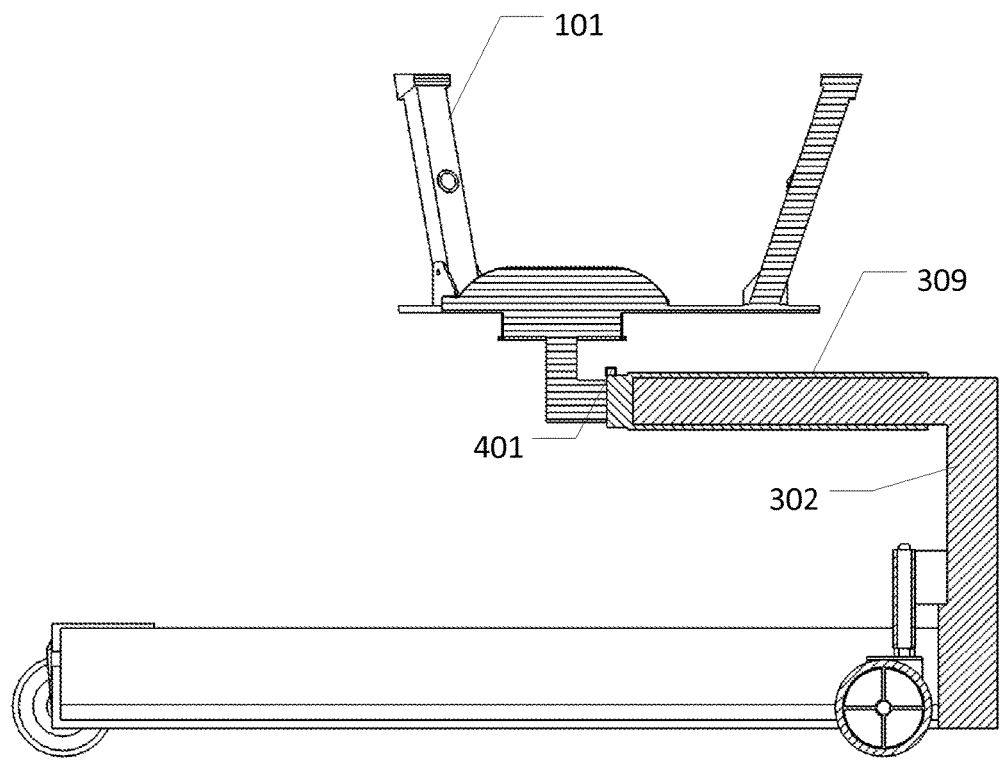
FIG. 5B illustrates a sectional view of a sliding sleeve that is at a refracted state.

FIG. 5B illustrates a sectional view of sliding sleeve 309 that is at a retracted state. In this embodiment, actuating sliding sleeve 309 inwards can retract tire holder 101 towards L-shaped frame 302.

Figure 6A:
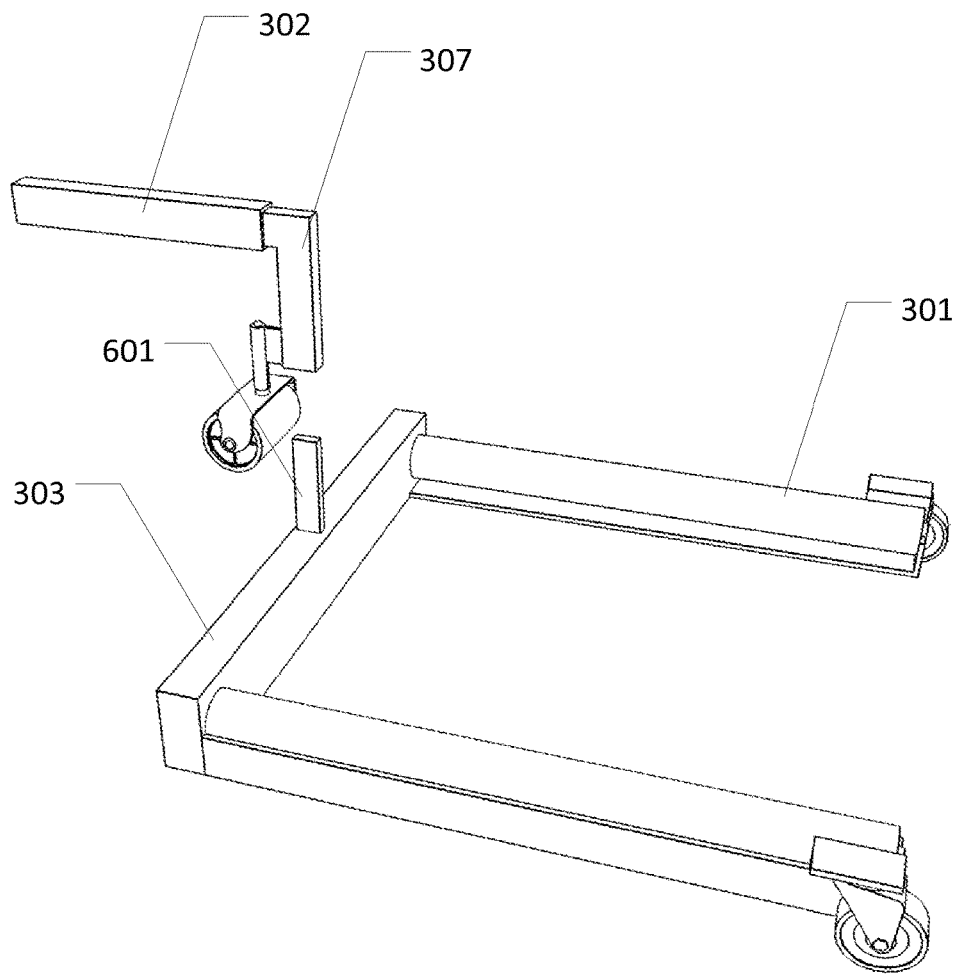
FIG. 6A illustrates an L-shaped frame detached from a U-shaped frame.

FIG. 6A illustrates L-shaped frame 302 detached from U-shaped frame 301. In this embodiment the middle portion of base 303 can comprise a slot 601. Slot 601 can be compatible with said L-shaped frame such that said short beam 307 is reversibly attachable into said slot.

Figure 6B:
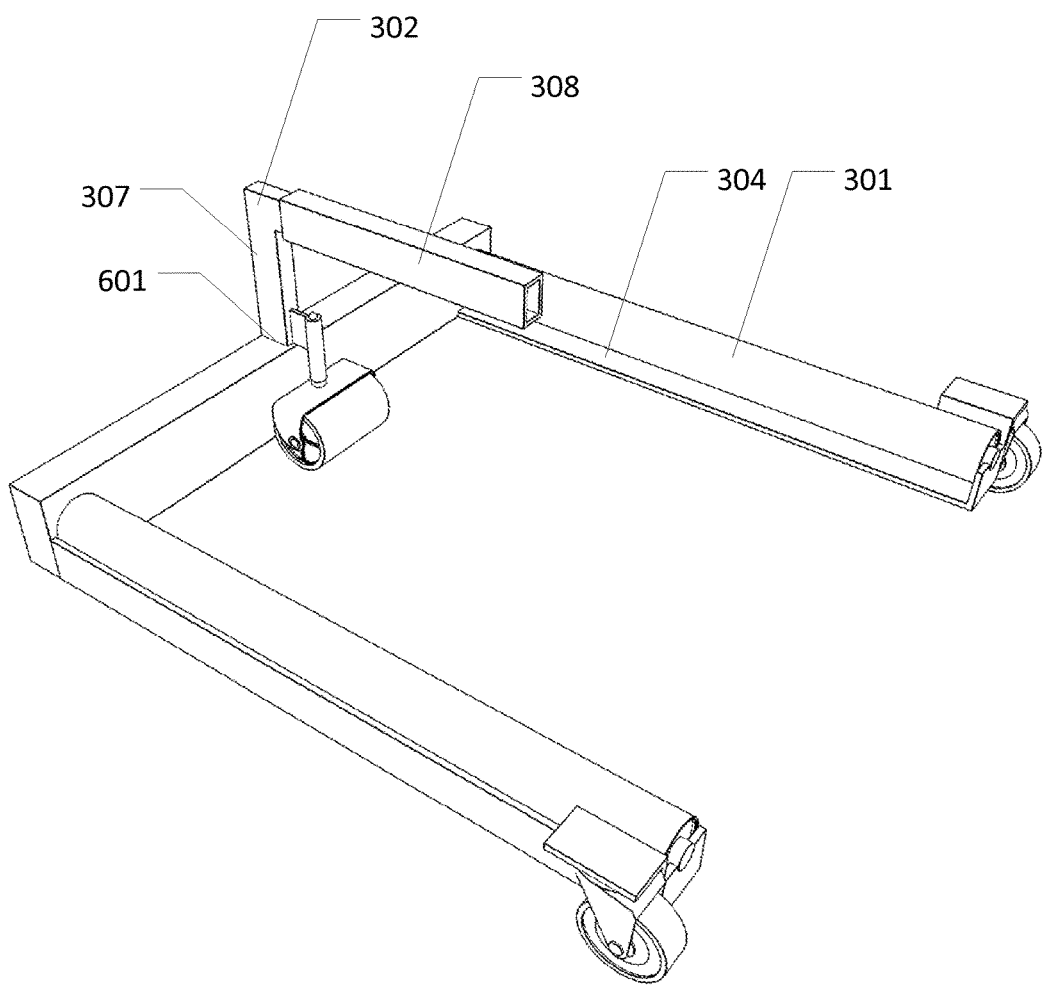
FIG. 6B illustrates an L-shaped frame attached to a U-shaped frame in a forward position.

FIG. 6B illustrates L-shaped frame 302 attached to U-shaped frame 301 in a forward position. In such structure, short beam 307 can be inserted into slot 601 to connect L-shaped frame 302 with U-shaped frame 301. Furthermore in this position, short beam 307 can be attached to slot 601 wherein long beam 308 can be pointing at the same direction with shafts 304.

Figure 6C:
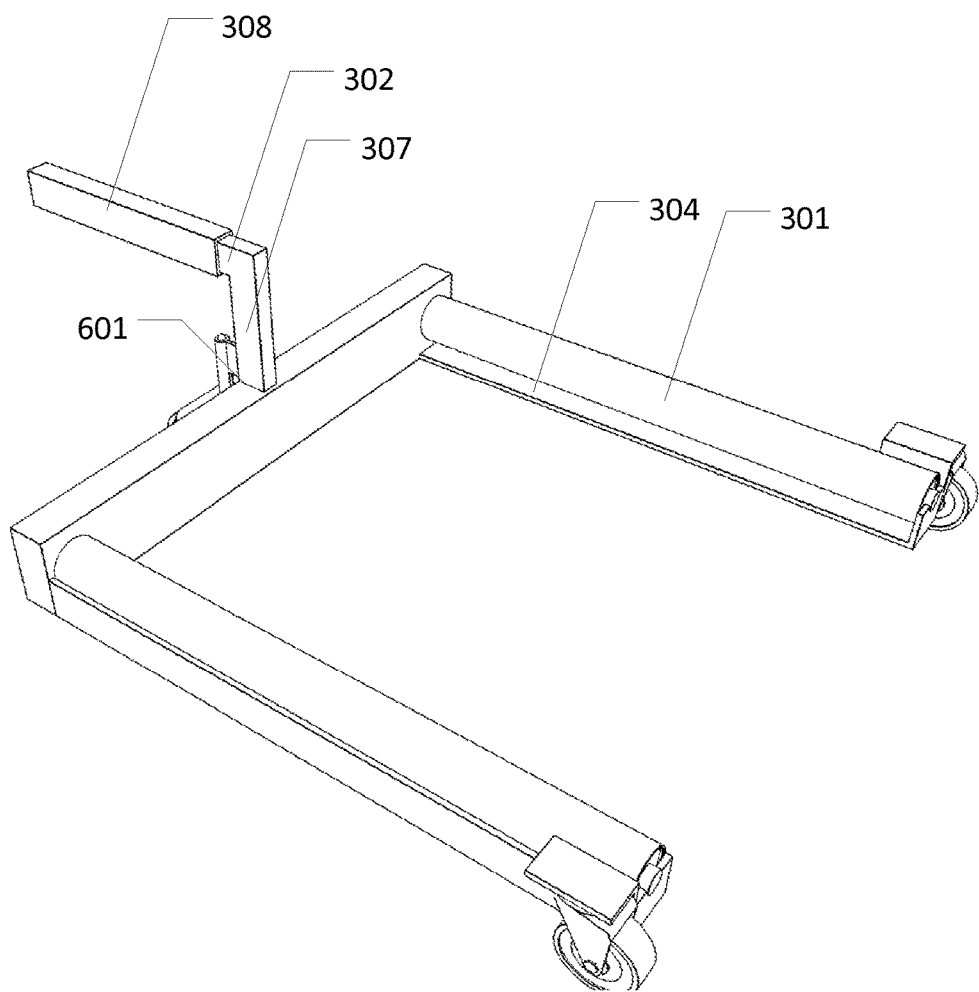
FIG. 6C illustrates an L-shaped frame attached to a U-shaped frame in a reversed position.

FIG. 6C illustrates L-shaped frame 302 attached to U-shaped frame 301 in a reversed position. In this position, short beam 307 can be inserted into slot 601 wherein long beam 308 can be pointing at the opposite direction of shafts 304.

Figure 7A:
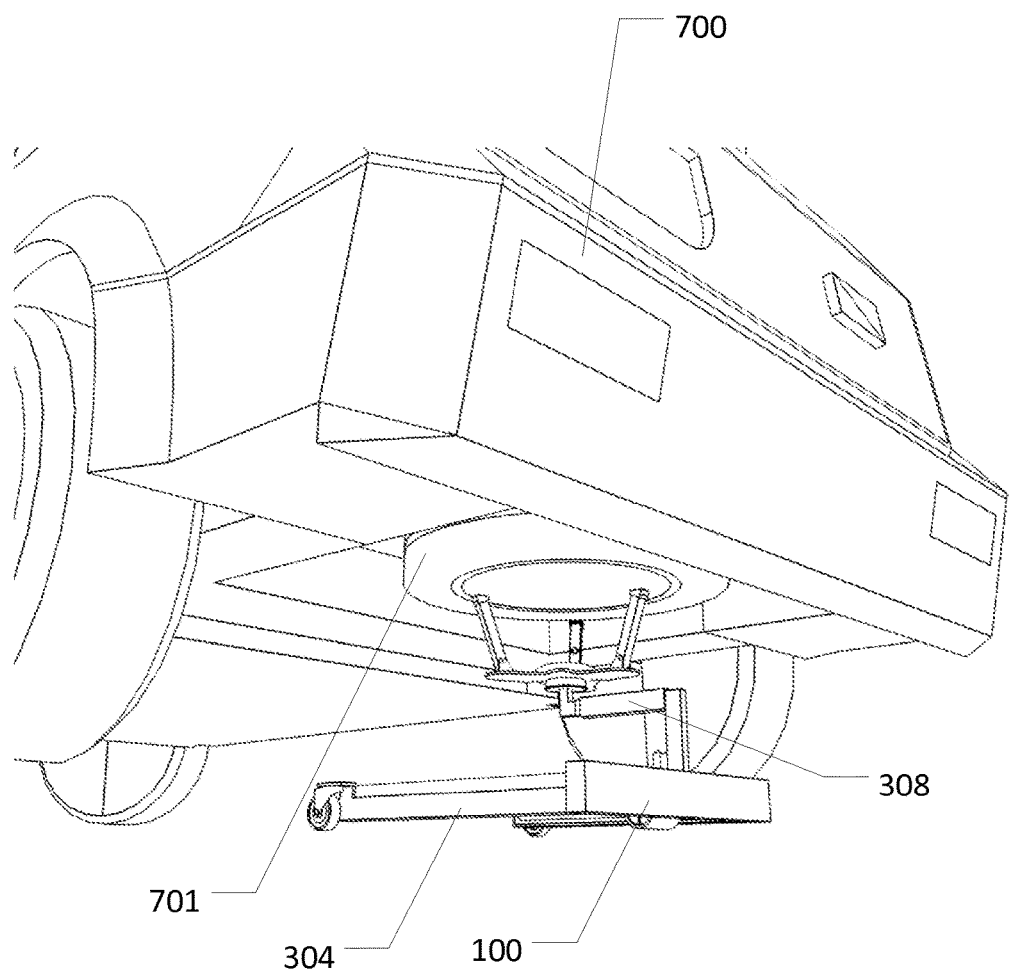
FIG. 7A illustrates a tire-changing device placed under a vehicle.

FIG. 7A illustrates tire-changing device 100 placed under a vehicle 700. In this scenario, a spare tire 701 can be mounted at the bottom of vehicle 700. In such scenario, tire-changing device 100 can be slid under vehicle 700 to retrieve spare tire 701. Tire-changing device 100 can be placed right under where spare tire 701 is mounted. In this embodiment, long beam 308 can be pointing at the same direction with shafts 304.

Figure 7B:
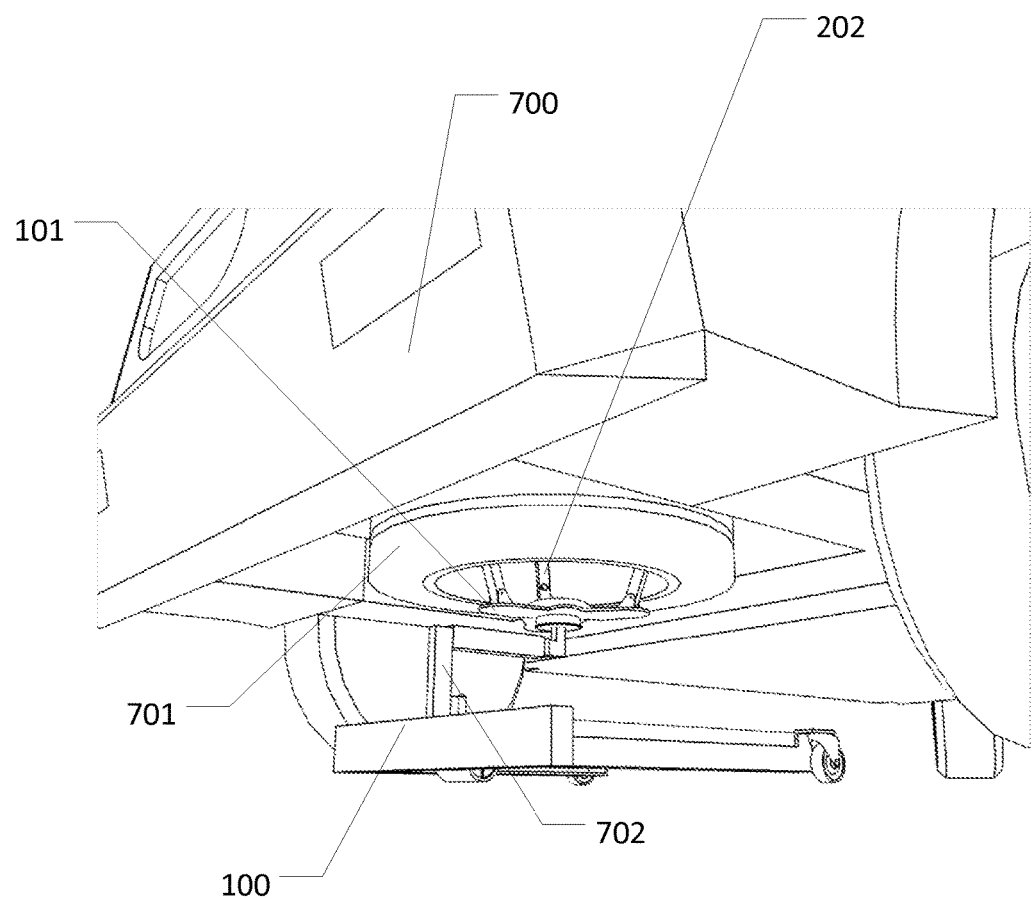
FIG. 7B illustrates a spare tire mounted on top of a tire holder.

FIG. 7B illustrates spare tire 701 mounted on top of tire holder 101. Tire holder 101 can be positioned directly under spare tire 701 such that when spare tire 701 is lowered to the ground, spare tire 701 can be horizontally placed on top of tire holder 101. In such position, prongs 202 can be aligned at the center of spare tire 701. This can allow prongs 202 to hold and balance spare tire 701 that is mounted at the top of tire holder 101.

Figure 7C:
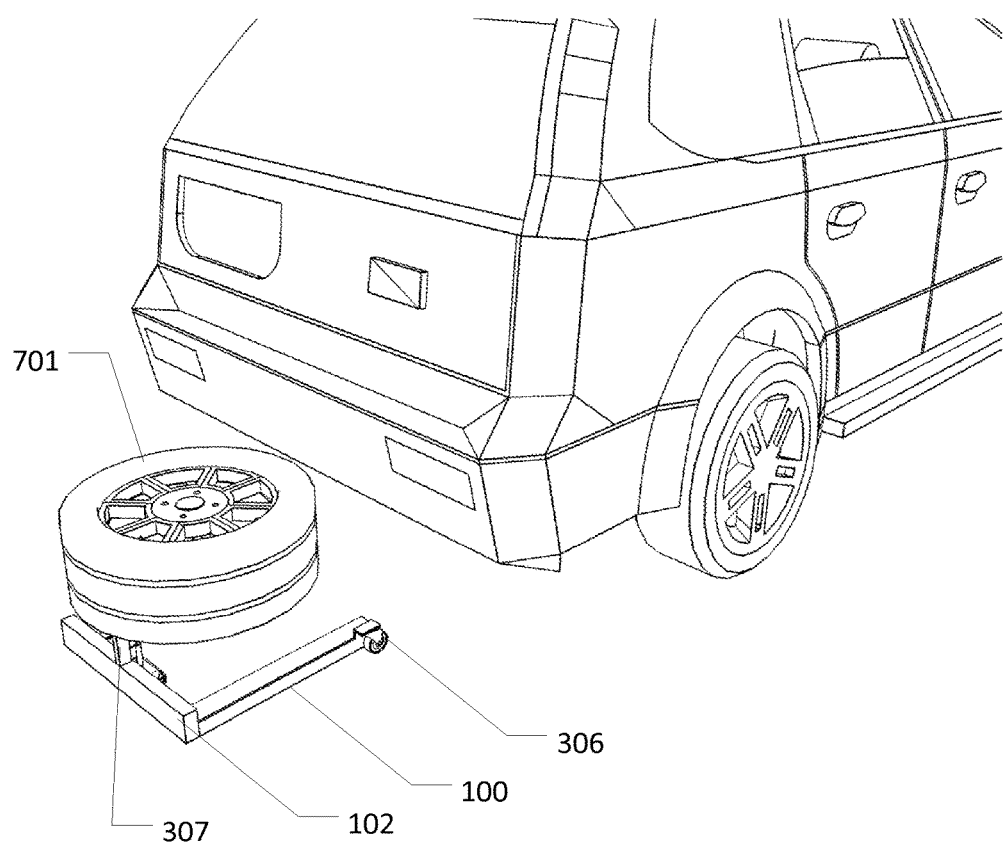
FIG. 7C illustrates a tire-changing device pulled away from a vehicle.

FIG. 7C illustrates tire-changing device 100 pulled away from vehicle. Once spare tire 701 is mounted on top of tire-changing device 100, the user can hold onto short beam 307 to pull tire-changing device 100 and spare tire 701 away from the bottom of the vehicle. Since spare tire 701 can be too heavy, wheel casters 306 that are attached on frame 102 can help user to easily maneuver tire-changing device 100 in any direction. The user can then unmount spare tire 701 from tire-changing device 100.

Figure 7D:
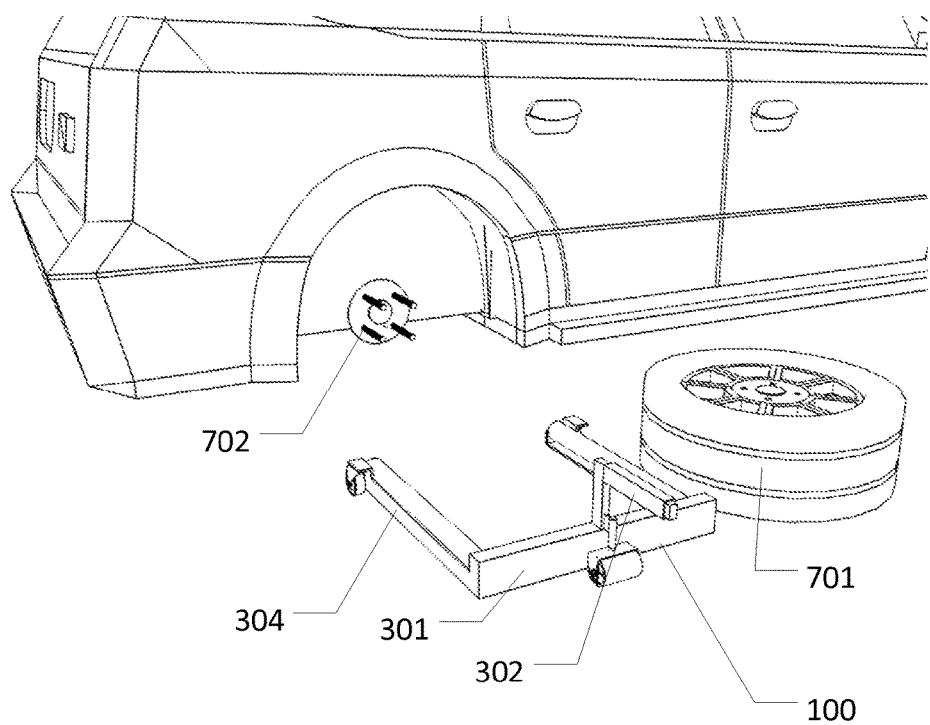
FIG. 7D illustrates a tire-changing device used to install a spare tire to an axle of a vehicle.

FIG. 7D illustrates tire-changing device 100 used to install spare tire 701 to an axle 702 of vehicle 701. After unmounting spare tire from tire holder 101, the user can removed L-shaped frame 302 from U-shaped frame 301 and then re-attach L-shaped frame 302 such that long beam 308 is pointing at the opposite direction of shafts 304. Furthermore, tire holder 101 can also be removed. In such embodiment, long beam 308 of L-shaped frame 302 can be used as a handle and allow the user to maneuver tire-changing device 100 to any desired direction.

Figure 7E:
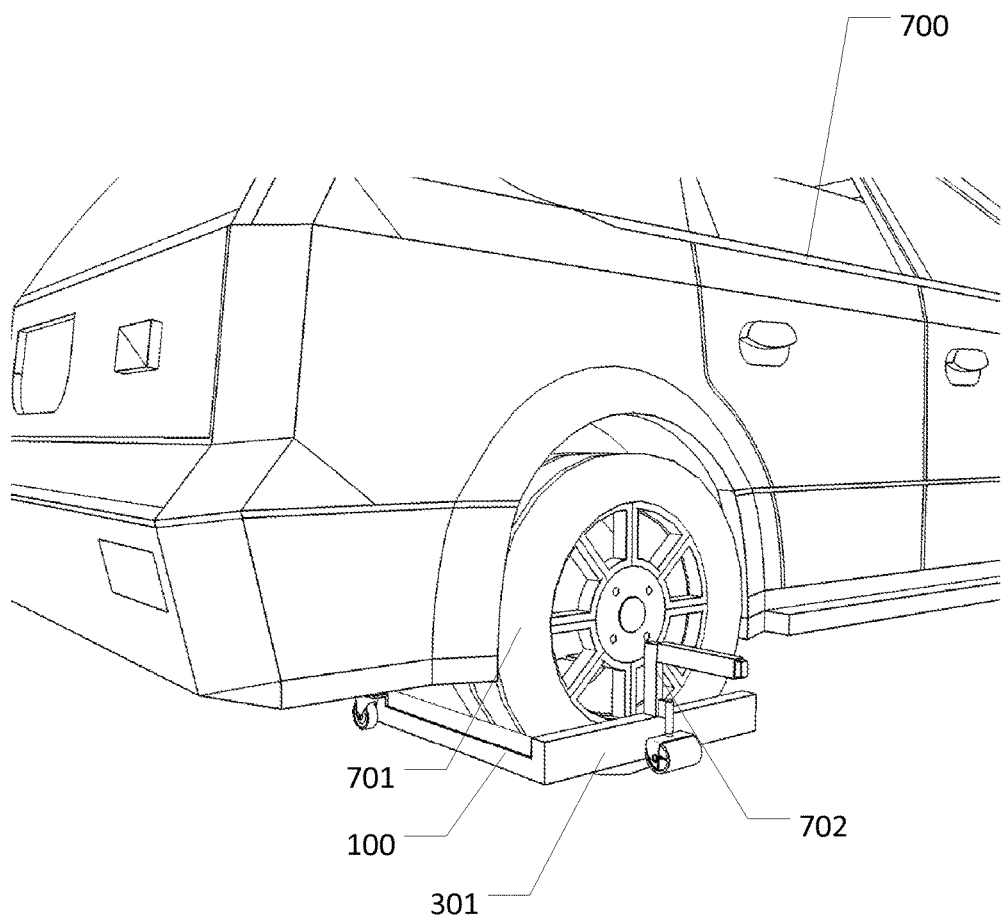
FIG. 7E illustrates a spare tire mounted on top of a U-shaped frame.

FIG. 7E illustrates spare tire 701 mounted on top of U-shaped frame 301. Spare tire 701 can be mounted vertically on top of U-shaped frame 301. In this position, the user can just move tire-changing device 100 to align spare tire 701 with axle 702 and then install spare tire 701. During this process, tire-changing device can be used in a similar manner to remove the old tire, and mounting old tire under vehicle 700.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A tire-changing device comprising
   a frame comprising
      a U-shaped frame comprising a base, a first shaft, and a second shaft, said first shaft connected to a first end, of said base, and said second shaft connected to a second end of said base; and
      an L-shaped frame comprising a short beam and a long beam, wherein one end of said short beam is attached at a bottom of said long beam, further wherein the other end of said short beam is connected at a middle portion of said base, further wherein said long beam comprises a sliding sleeve, said sliding sleeve adjustable within said long beam such that said sliding sleeve is extendable and retractable from said long beam; and
   a tire holder attachable with said L-shaped frame, wherein said tire holder comprises
      a base plate comprising a disc and a plurality of blades, said disc placed between said blades;
      a plurality of prongs, each of said prongs attached at a top edge portion of each of said blades; and
      an L-shaped connector comprising a vertical member and a horizontal member.

2. The tire-changing device of claim 1 wherein said sliding sleeve further comprises a rubber grip.

3. The tire-changing device of claim 1 said sliding sleeve comprises a cavity, further wherein said cavity is mateable with said horizontal member.

4. The tire-changing device of claim 3 wherein said sliding sleeve further comprises a button, said button securing said tire holder within said sliding sleeve.

5. The tire-changing device of claim 4 wherein said button is a spring button lock.

6. The tire-changing device of claim 1 wherein a tip of said vertical member comprises a swivel bearing, said swivel bearing mounted at a base plate bottom.

7. The tire-changing device of claim 1 wherein a middle portion of said base comprises a slot, said L-shaped frame detachable from said U-shaped frame through said slot, further wherein said slot is compatible with said L-shaped frame such that said short beam is reversibly attachable to said slot.

8. The tire-changing device of claim 7 wherein each of said prongs comprises a LED light.

9. The tire-changing device of claim 7 wherein a tip of each of said prongs comprises a rubber stopper.

10. The tire-changing device of claim 1 wherein a first top surface of said first shaft comprises a first roller and a second top surface of said second shaft comprises a second roller, further wherein said first roller is rotatable around a first axis of said first shaft, and said second roller is rotatable around a second axis of said second shaft.

11. The tire-changing device of claim 1 wherein a first front-end portion of said first shaft comprises a first wheel caster, and a second front-end portion of said second shaft comprises a second wheel caster.

12. A tire-changing device comprising
    a frame comprising
       a U-shaped frame comprising a base, a first shaft, and a second shaft, said first shaft connected to a first end of said base, and said second shaft connected to a second end of said base; and
       an L-shaped frame comprising a short beam and a long beam, wherein one end of said short beam is attached at a bottom of said long beam, further wherein the other end of said short beam is connected at a middle portion of said base; and
    a tire holder attachable with said L-shaped frame, wherein said tire holder comprises
       a base plate comprising a disc and a plurality of blades, said disc placed between said blades;
       a plurality of prongs, each of said prongs attached at a top edge portion of each of said blades, wherein each of said prongs are attached at a top of said blades through a caster, said caster allowing each of said plurality of prongs to be foldable toward said disc; and
       an L-shaped connector comprising a vertical member and a horizontal member.

13. The tire-changing device of claim 12 wherein said long beam comprises a sliding sleeve, said sliding sleeve adjustable within said long beam such that said sliding sleeve is extendable and retractable from said long beam.

14. The tire-changing device of claim 13 wherein said sliding sleeve further comprises a rubber grip.

15. The tire-changing device of claim 13 said sliding sleeve comprises a cavity, further wherein said cavity is mateable with said horizontal member.

16. The tire-changing device of claim 15 wherein said sliding sleeve further comprises a button, said button securing said tire holder within said sliding sleeve.

17. The tire-changing device of claim 16 wherein said button is a spring button lock.

18. The tire-changing device of claim 12 wherein a tip of said vertical member comprises a swivel bearing, said swivel bearing mounted at a base plate bottom.

19. The tire-changing device of claim 12 wherein a middle portion of said base comprises a slot, said L-shaped frame detachable from said U-shaped frame through said slot, further wherein said slot is compatible with said L-shaped frame such that said short beam is reversibly attachable to said slot.

20. The tire-changing device of claim 19 wherein each of said prongs comprises a LED light.

21. The tire-changing device of claim 19 wherein a tip of each of said prongs comprises a rubber stopper.

22. The tire-changing device of claim 12 wherein a first top surface of said first shaft comprises a first roller and a second top surface of said second shaft comprises a second roller, further wherein said first roller is rotatable around a first axis of said first shaft, and said second roller is rotatable around a second axis of said second shaft.

23. The tire-changing device of claim 12 wherein a first front-end portion of said first shaft comprises a first wheel caster, and a second front-end portion of said second shaft comprises a second wheel caster.

* * * * *